Dec. 9, 1952 N. A. ANDERSSON 2,620,747
TANK WAGON WITH BOGIE
Filed Feb. 3, 1950 5 Sheets-Sheet 3
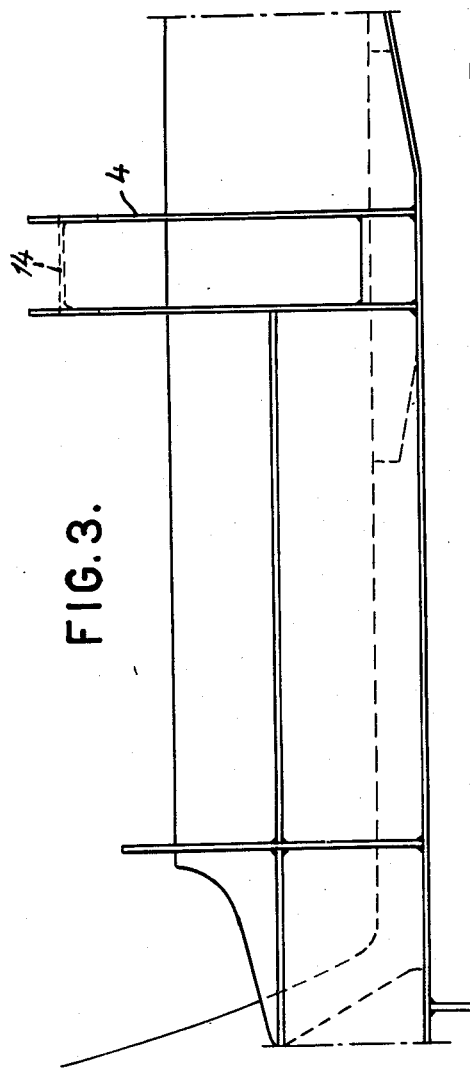
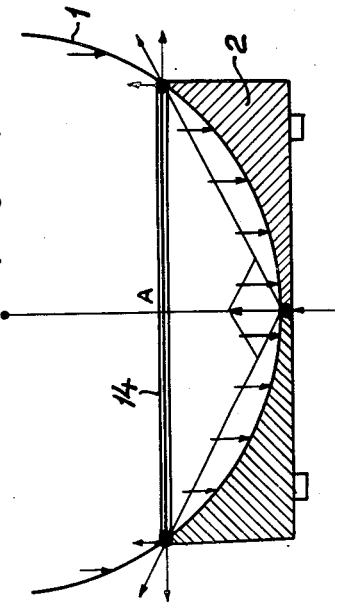
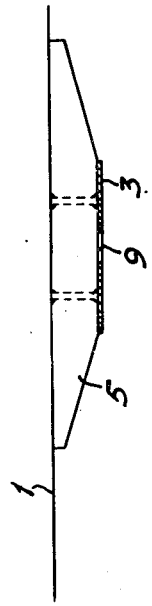
Inventor
N. A. Andersson Dec. 9, 1952 N. A. ANDERSSON 2,620,747
TANK WAGON WITH BOGIE
Filed Feb. 3, 1950 5 Sheets-Sheet 4
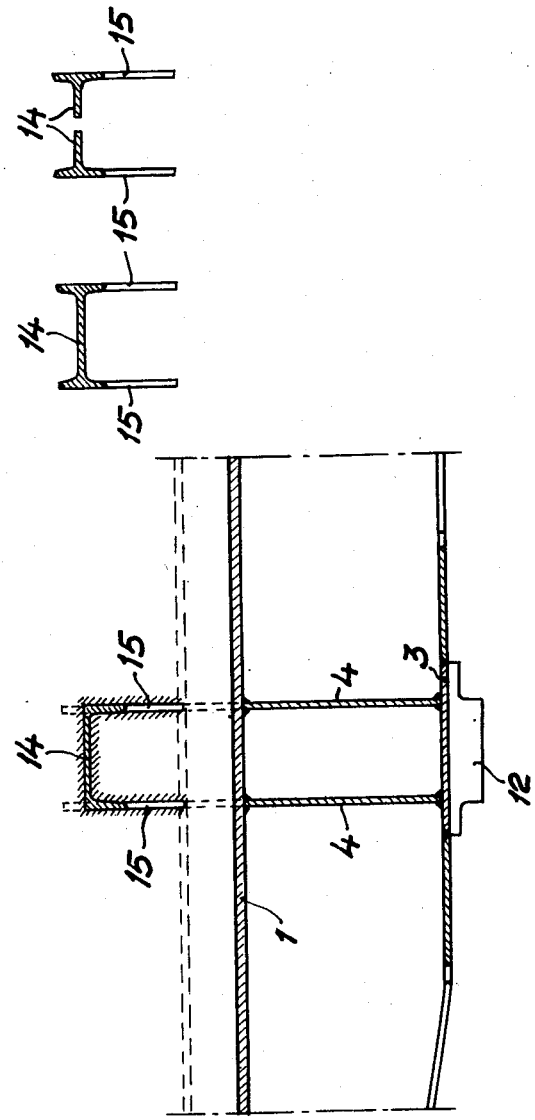
Inventor
N. A Andersson Dec. 9, 1952    N. A. ANDERSSON    2,620,747
TANK WAGON WITH BOGIE Filed Feb. 3, 1950    5 Sheets-Sheet 5

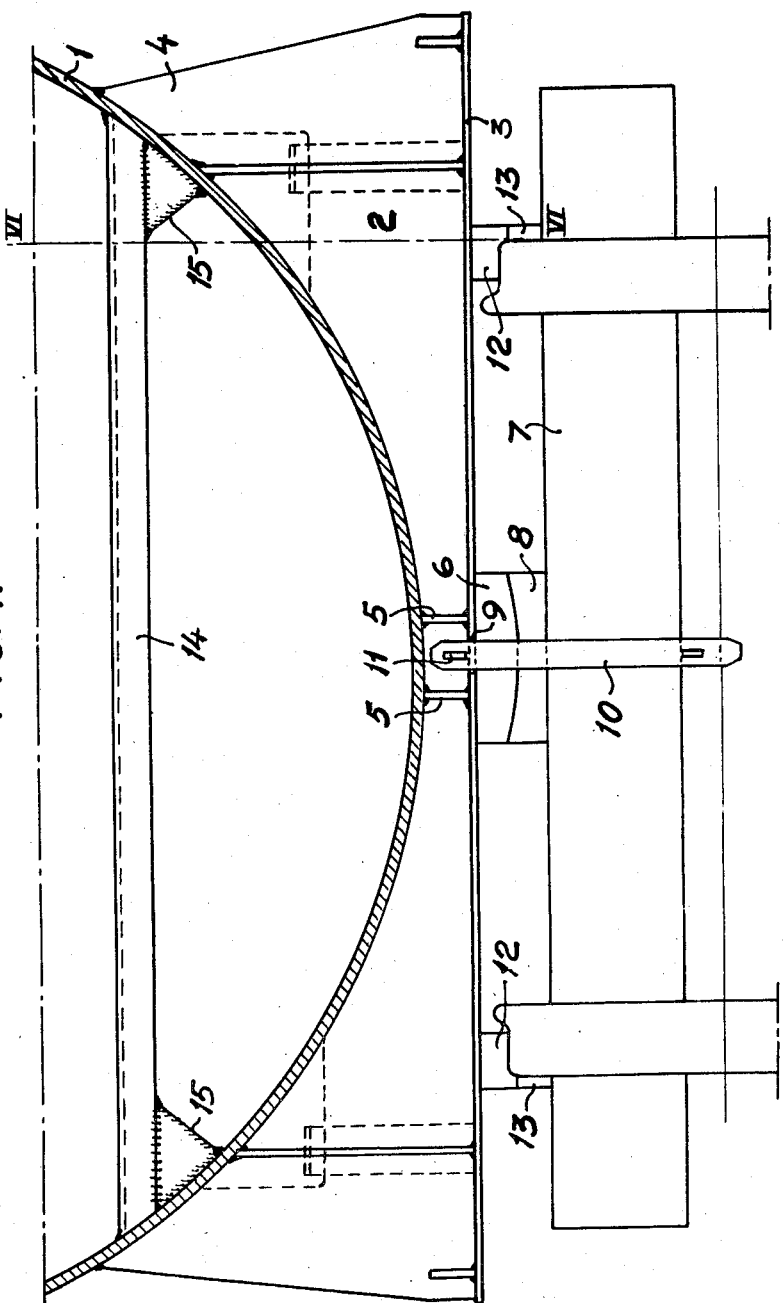

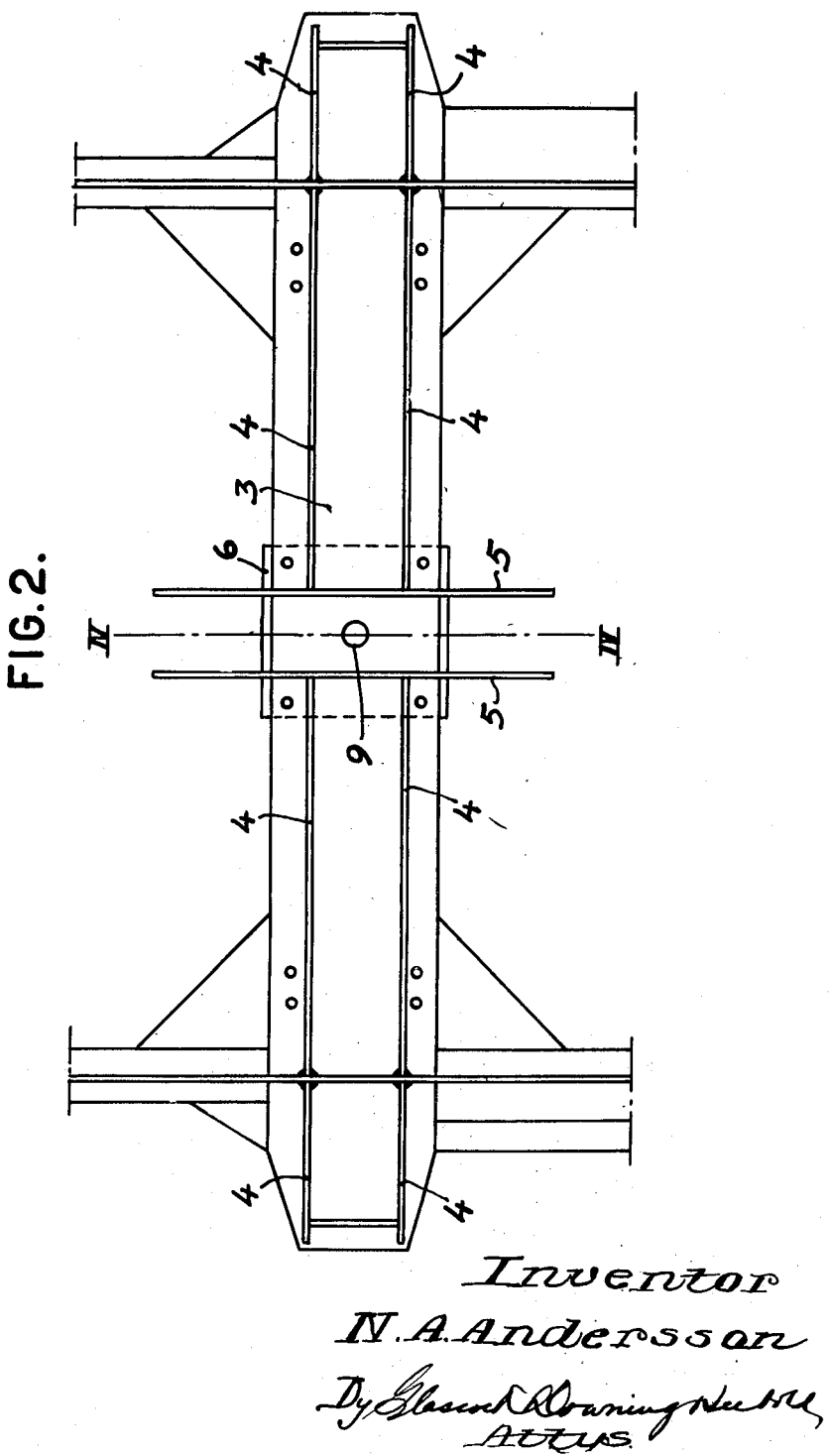

Inventor
N. A. Andersson
By Hancock Downing Huddle
Attys.

Patented Dec. 9, 1952

2,620,747

UNITED STATES PATENT OFFICE 2,620,747

TANK WAGON WITH BOGIE

Nils Albin Andersson, Bromma, Sweden

Application February 3, 1950, Serial No. 142,302
In Sweden November 26, 1946

6 Claims. (Cl. 105—358)

The present invention relates to all welded tank wagons or cars with bogies wherein the tank is welded to the underframe parts and more particularly to centre beam structures for such tank wagons or cars.

The centre beam of tank wagons with bogies to which the load is transmitted by pivot bearings provided on the centre beam in the middle line of the wagon is exposed to the greatest bending stresses at the middle of the beam, if the latter is arranged in the normal manner, and therefore the beam must be given a comparatively large transversal height in order to obtain the necessary strength.

This is undesirable, because the tank must be correspondingly elevated, whereby the centre of gravity of the wagon will be located higher up and, in consideration of the load profile, the diameter of the tank cannot be made as large as when the tank assumes a lower position.

A low position of the tank may be desirable also from other viewpoints.

Of course, it might be possible to obtain a low external transversal height of the centre beam by building it completely or partly into the tank. However, this would involve the very great inconvenience that the tank bottom would not be free on the inside, which would cause troubles for the cleaning of the tank and the discharge of its contents. The construction according to this invention provides a completely free tank bottom.

According to the present invention, the centre beam is constructed with a low middle portion and a straight or approximately straight lower edge, which is the natural shape of a centre beam that is welded against a tank, also in consideration of the fact that so-called side bearings for the bogie are to be arranged at the ends of the centre beam. The said shape renders the centre beam very strong towards the ends. If now there is provided within the tank a horizontal cross bar at such a height above the tank bottom that the cross bar connects on to the end portions of the centre beam which rise against the sides of the tank, the centre beam will not have to resist any bending stresses in the middle part, but must only have sufficient section at the said part to be able to resist arising horizontal compressing strains at right angles to the longitudinal direction of the tank. The centre beam would be able to resist the vertical strain from the pivot bearing even if it were hinged at the middle, because the two halves of the centre beam together with the cross bar are forming a rigid rod system—a framework—which without difficulty may be sufficiently strongly dimensioned even at a very low transverse height in the middle of the beam.

As will be seen from the drawings, this construction also renders the advantage that the middle portion of the centre beam may be shaped so as to allow the provision of a centre pin through the pivot bearing. In ordinary wagons, the centre pin is usually inserted and removed from above, but this is not possible in a tank wagon. At the centre beam according to this invention, the centre pin is inserted from below and a wedge is inserted in the upper end of the pin. The wedge is easily accessible in the centre beam because recesses may be provided in the web plates of the beam without causing any inconveniences.

The invention is illustrated by an embodiment in the accompanying drawing, in which Fig. 1 is a frontal view, partly in section, of a tank wagon according to the invention, Fig. 2 is a plan view and Fig. 3 is a side view of the centre beam, Fig. 4 is a section along the line IV—IV in Fig. 2, Fig. 5 is a diagram showing the distribution of the strains, Fig. 6 is a vertical sectional view taken along the line VI—VI of Fig. 1, the view looking in the direction of the arrows.

Figs. 10 and 11 are vertical sectional views of other structural parts used as a horizontal cross bar.

Figure 7:
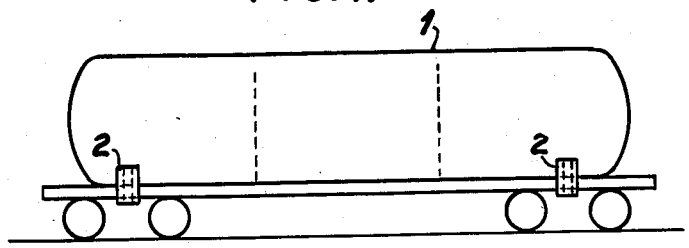
Figs. 7, 8 and 9 are a side view, a plan view and an end view respectively showing how the invention is applied to a wagon with central buffers.
Figure 8:
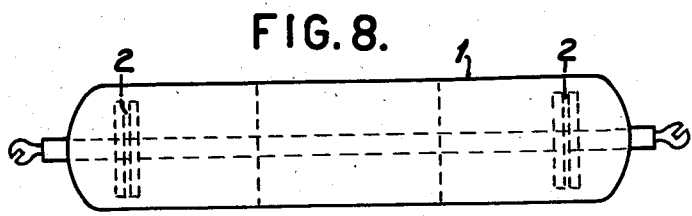
Figure 9:
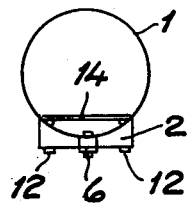

Referring now to the drawing, 1 designates a tank which is carried by a centre beam 2, which consists of a horizontal base plate 3 extending in the transverse direction of the tank, said base plate being provided with two vertical plates 4 secured at some distance from each other and extending in the longitudinal direction of the base plate, and the end portions of which rise toward the tank, shaped after the same and welded thereto. In the middle, the vertical plates 4 are crossed by two parallel, vertical plates 5 extending in the longitudinal direction of the tank at some distance from each other. In the middle of its lower side the base plate 3 is provided with a pivot bearing 6 of known construction, which rests upon a bearing 8 supported by the bogie 7. A hole 9 is provided in the middle of the base plate between the vertical plates 5, said hole also extending through the pivot bearing 6 and the bearing 8 and having inserted therein a centre pin 10, which is retained in its position by means of a wedge (not shown) inserted through a transverse hole 11 in the pin 10. Side bearings 12 co-operating with corresponding side bearings 13 on the bogie 7 are provided at the ends of the base plate 3.

Within the tank and above the centre beam 2, there is inserted a horizontal cross bar 14 at such a height above the tank bottom that the said bar connects on to the centre beam ends which rise against the tank sides. As shown in Fig. 6, the bar 14 may be a U-beam, the beam being welded to the tank wall. The connection between the beam and the tank wall may be reinforced by angle sheet irons 15 located in front of the plates 4. Instead of a U-beam, the bar may be an I-beam 14A as shown in Fig. 10 or two T-beams such as depicted in Fig. 11.

Having now described my invention, what I claim as new and desire to secure by Letters Patent is:

1. In a mobile vehicle, a cylindrical tank, bogie trucks therefor and a beam located between each truck and the outer wall of the tank, said beam including a planar base extending transversely of the truck and tank and supported by the truck, at least one upstanding member on said base plate extending longitudinally thereof, the upper edge of said upstanding member having an arcuate contour whereby said edge conforms to the curvature of the tank wall with the end edges extending a substantial distance upwardly respecting the tank wall, means securing said upper edge to the tank wall and a cross bar extending horizontally within the tank with each end thereof secured to the upper edge of the upstanding member in proximity to the end edges of the said member through the tank wall thus rigidly supporting the tank on said beam.

2. In a mobile vehicle, a cylindrical tank, bogie truck therefor and a beam located between each truck and the outer wall of the tank, said beam including a planar base extending transversely of the truck and tank and supported by the truck, a pair of spaced apart parallel longitudinally extending upstanding members on said base plate, the upper edge of each upstanding member having an arcuate contour whereby said edge conforms to the curvature of the tank wall with the end edges extending a substantial distance upwardly respecting the tank wall, means securing each of said upper edges to the tank wall and a cross bar disposed horizontally within the tank with each end thereof secured to the upper edges of said upstanding members in proximity to the end edges of said members through the tank wall thereby rigidly supporting the tank on said beam.

3. In a mobile vehicle, a cylindrical tank, bogie trucks therefor and a beam located between each truck and the outer wall of the tank, said beam including a planar base extending transversely of the truck and tank and supported by the truck, a pair of spaced apart parallel upstanding members on said base plate extending longitudinally of said plate, the upper edge of each upstanding member having an arcuate contour whereby said edge conforms to the curvature of the tank wall with the end edges extending a substantial distance upwardly respecting the tank wall, means securing each of said upper edges to the tank wall, a pair of spaced vertical plates on said base plate at approximately the mid point thereof extending transversely of the base plate and bisecting said upstanding members, the upper edge of each vertical plate being in engagement with and secured to the tank wall, and a cross bar disposed horizontally within the tank with each end thereof secured to the upper edges of said upstanding members in proximity to the end edges of said member through the tank wall whereby said upstanding members and said vertical plates rigidly support the tank on the base plate of said beam.

4. A mobile vehicle as claimed in claim 2 wherein said truck and planar base plate are provided with complemental pivot elements, said base plate, pivot elements and truck being provided with aligned apertures for receiving a safety pin, and means located above said base plate to retain said pin in the apertures.

5. In a mobile vehicle, a tank body, bogie trucks therefor and a beam located between each truck and the outer wall of the tank, said beam comprising a planar base extending transversely of the truck and tank and supported by the truck, at least one upstanding member on the base plate extending longitudinally thereof, the upper edge of said upstanding member having a contour conforming to the configuration of the tank wall with the end edges extending a substantial distance upwardly respecting the tank wall and a cross bar extending horizontally within the tank with each end thereof secured to the upper edge of the upstanding member in proximity to the end edges of said member through the tank wall thus rigidly supporting the tank on said beam.

6. In a mobile vehicle, a tank body, bogie trucks therefor and a beam located between each truck and the outer wall of the tank, said beam comprising a planar base extending transversely of the truck and tank and supported by the said truck, a pair of spaced apart parallel upstanding members on said base plate extending longitudinally of said plate, the upper edge of each upstanding member having a contour conforming to the configuration of the tank wall with the end edges extending a substantial distance upwardly respecting the tank wall, means securing each of said upper edges to the tank wall, a pair of spaced vertical plates on said base plate at approximately the midpoint thereof extending transversely of the base plate and bisecting said upstanding members, the upper edge of each of said vertical plates being in engagement with and secured to the tank wall, and a cross bar disposed horizontally within the tank with each end thereof secured to the upper edges of said upstanding members in proximity to the end edges of said member through the tank wall whereby said upstanding members and said vertical plates rigidly support the tank on the base plate of said beam.

NILS ALBIN ANDERSSON.

REFERENCES CITED

The following references are of record in the file of this patent:

UNITED STATES PATENTS

| Number | Name | Date |
|---|---|---|
| 946,647 | Priebe | Jan. 18, 1910 |
| 1,836,389 | Pflager | Dec. 15, 1931 |
| 2,032,212 | Howard | Feb. 25, 1936 |